(12) United States Patent
Benson

(10) Patent No.: US 9,890,664 B2
(45) Date of Patent: Feb. 13, 2018

(54) INTEGRATED POWER, COOLING, AND HEATING APPARATUS UTILIZING WASTE HEAT RECOVERY

(71) Applicant: Dwayne M. Benson, Chandler, AZ (US)

(72) Inventor: Dwayne M. Benson, Chandler, AZ (US)

( * ) Notice: Subject to any disclaimer, the term of this patent is extended or adjusted under 35 U.S.C. 154(b) by 0 days.

(21) Appl. No.: 14/053,397

(22) Filed: Oct. 14, 2013

(65) Prior Publication Data
US 2014/0041387 A1 Feb. 13, 2014

Related U.S. Application Data

(63) Continuation of application No. 12/802,219, filed on Jun. 2, 2010.

(51) Int. Cl.
| | |
|---|---|
| F01K 13/00 | (2006.01) |
| F25B 27/02 | (2006.01) |
| F25B 7/00 | (2006.01) |
| F01K 25/10 | (2006.01) |
| F25B 29/00 | (2006.01) |

(52) U.S. Cl.
CPC ........... F01K 13/006 (2013.01); F01K 25/10 (2013.01); F25B 7/00 (2013.01); F25B 27/02 (2013.01); F25B 29/003 (2013.01); F25B 2400/141 (2013.01); Y02E 10/46 (2013.01); Y10T 29/49002 (2015.01)

(58) Field of Classification Search
CPC ........ F02B 41/10; F02B 37/005; F02B 37/02; F02B 3/06; F02B 75/02; F02G 5/02; F02G 5/04; F01K 23/065; F01K 23/04; F01K 23/02

USPC ............ 62/238.4, 238.6, 238.7, 172; 60/653, 60/660, 670, 772; 165/50

See application file for complete search history.

(56) References Cited

U.S. PATENT DOCUMENTS

| | | |
|---|---|---|
| 1,871,244 A | 8/1932 | Steuart |
| 2,511,716 A | 6/1950 | Katzow |
| 2,875,589 A | 3/1959 | Horn |
| 3,153,442 A | 10/1964 | Silvern |
| 3,720,842 A * | 3/1973 | Martin et al. .................. 307/68 |
| 4,024,908 A | 5/1977 | Meckler |
| 4,118,934 A | 10/1978 | Brola |
| 4,271,679 A | 8/1981 | Schafer |
| 4,531,379 A | 7/1985 | Diefenthaler, Jr. |
| 4,738,111 A | 4/1988 | Edwards |
| 5,228,309 A | 7/1993 | McCullough |

(Continued)

Primary Examiner — Jianying Atkisson
Assistant Examiner — Meraj A Shaikh
(74) Attorney, Agent, or Firm — Robert D. Atkins; Patent Law Group: Atkins and Associates, P.C.

(57) ABSTRACT

The present invention provides an apparatus for utilizing waste heat to power a reconfigurable thermodynamic cycle that can be used to selectively cool or heat an environmentally controlled space, such as a room, building, or vehicle. The present invention also integrates an electric machine, which may operate as a motor or generator, or both, and an additional prime mover, such as an internal combustion engine. Different combinations of these components are preferable for different applications. The system provides a design which reasonably balances the need to maximize efficiency, while also keeping the design cost effective.

20 Claims, 4 Drawing Sheets

(56) References Cited

U.S. PATENT DOCUMENTS

| | | | |
|---|---|---|---|
| 5,448,889 A * | 9/1995 | Bronicki | 60/641.14 |
| 5,685,152 A | 11/1997 | Sterling | |
| 5,839,282 A * | 11/1998 | Bronicki et al. | 60/641.5 |
| 6,178,733 B1 * | 1/2001 | Nelson | 60/778 |
| 6,581,384 B1 * | 6/2003 | Benson | 60/653 |
| 6,606,860 B2 | 8/2003 | McFarland | |
| 7,178,358 B2 | 2/2007 | Inaba et al. | |
| 7,523,621 B2 | 4/2009 | Johansson | |
| 8,393,171 B2 | 3/2013 | Alston | |
| 8,482,152 B1 | 7/2013 | Stahlkopf et al. | |
| 2003/0000213 A1 | 1/2003 | Christensen et al. | |
| 2003/0228237 A1 * | 12/2003 | Holtzapple et al. | 418/171 |
| 2004/0088993 A1 * | 5/2004 | Radcliff et al. | 60/772 |
| 2006/0218812 A1 | 10/2006 | Brown | |
| 2007/0051126 A1 | 3/2007 | Okuda et al. | |
| 2007/0280400 A1 * | 12/2007 | Keller | 376/317 |
| 2007/0289326 A1 | 12/2007 | Nishikawa et al. | |
| 2008/0006040 A1 | 1/2008 | Peterson et al. | |
| 2009/0266093 A1 | 10/2009 | Aoki | |
| 2009/0266096 A1 | 10/2009 | Minds et al. | |
| 2010/0319346 A1 | 12/2010 | Ast et al. | |
| 2011/0000182 A1 | 1/2011 | Lasker | |
| 2011/0193346 A1 * | 8/2011 | Guzman et al. | 290/52 |

* cited by examiner

INTEGRATED POWER, COOLING, AND HEATING APPARATUS UTILIZING WASTE HEAT RECOVERY

CLAIM TO DOMESTIC PRIORITY

The present application is a continuation of U.S. application Ser. No. 12/802,219, filed Jun. 2, 2010, which application is incorporated herein by reference.

FIELD OF THE INVENTION

The present invention relates to a method of integrating an electrical power generator and/or an electrical motor with a heat driven air conditioning and heating system to provide power, cooling, and heating to an environmentally controlled space, such as a building, vehicle, or shelter.

BACKGROUND OF THE INVENTION

Many industrial processes produce waste heat of low temperature, such that little useful work is generally accomplished with this waste heat. It is well known that certain thermodynamic cycles, such as absorption cooling, can provide environmental cooling even from low grade heat sources, such as thermal solar, engine exhaust, and bottoming cycles for industrial steam generators, but absorption cooling suffers from low efficiencies. In addition, cycles, such as absorption cooling, cannot easily integrate electrical power generation.

Prior art has not completely integrated heating and cooling with electrical power generation, or alternatively with an electric motor/generator to supplement the thermodynamic cycle with the electric motor during periods of low thermal energy availability. Furthermore, a self-contained system that includes a prime mover, such as an internal combustion engine, combined with power generation and heat and cooling functions, which are further supplemented by waste heat recovery from the engine exhaust have not been described. In the prior art, some systems use refrigerant as the working fluid to generate electrical power (Edwards, U.S. Pat. No. 4,738,111), commonly referred to as an Organic Rankine Cycle. Other systems provide for power and cooling, but use an external combustor, instead of an internal combustion engine (McCullough, U.S. Pat. No. 5,228,309). Many do not consider the need for recuperation, which transfers the remaining usable heat at the output of the Rankine expander to pre-heat fluid entering the heater or boiler.

Prior art for the apparatus that provides the heating and cooling functions have been well described elsewhere (Benson, U.S. Pat. No. 6,581,384). It can be summarized that none have maximized the efficiency achievable with a combined Rankine and refrigeration cycle. Some approaches either do not recuperate heat from the working fluid (Steuart, U.S. Pat. No. 1,871,244) or do not recuperate heat in a fashion that maximizes the temperature of the working fluid entering the heating device (Brola, U.S. Pat. No. 4,118,934). Some systems attempt to only provide heating (Schafer, U.S. Pat. No. 4,271,679) or cooling (Horn, U.S. Pat. No. 2,875,589) but not both. Some add complexity by using separate working fluids for the power and heat pump cycles (Silvern, U.S. Pat. No. 3,153,442) (Schafer, U.S. Pat. No. 4,271,679).

Hence, there is a need for a single system of sufficient efficiency and simplicity to make the manufacture and operation economically attractive. Since the intent of the system is to operate from external heat source, or be supplemented by recovery of heat from an integrated prime mover, the integrated power, heating and cooling system must be flexible enough to accommodate variable electrical and air conditioning loads and allow simple controls with a minimum of sensors and actuators.

FIG. 1 shows the basic heat driven cooling cycle as described in prior art (Benson, U.S. Pat. No. 6,581,348). As illustrated in FIG. 1, the apparatus is configured for the cooling mode and consists of a working fluid which has a low critical pressure and temperature, such as a common refrigerant, and a liquid pump 47, which pressurizes the refrigerant from an intermediate pressure liquid to a high pressure liquid. The high pressure liquid passes through one or more recuperators, 17 and 14, to become preheated prior to passing to heater 2, where a heat source 1 heats the working fluid. The working fluid passes through the expander start-up and overspeed control valve 8 to expander 9. The working fluid is expanded through expander 9, which may be a turbine, piston motor, or some other device which can extract work from the working fluid. While passing through expander 9, work is extracted from the working fluid. Expander 9 drives a compressor 13 through a common shaft, where a speed sensor 11 transmits the speed of expander 9 and compressor 13 rotating group back to the controller to use in the speed control logic.

The exhaust from expander 9 passes through recuperator 14 and 17, where much of the heat is transferred from the expander exhaust gas to the liquid entering heater 2. Compressor 13, using the same working fluid as expander 9, compresses the working fluid from a low pressure, gaseous state to an intermediate pressure gas as part of a typical refrigeration cycle. The output from compressor 13 is co-mingled with the outlet of first recuperator 14. The combined outlet flows from expander 9 and first recuperator 14 and can then be optionally passed into recuperator 17 to extract as much heat from the working fluid as possible. The working fluid then passes through five-way reversing valve 23 from port 18 to port 20 to condenser heat exchanger 26. In an alternative embodiment, the condenser may be cooled by an externally chilled fluid as would be supplied by an evaporative type chiller.

The working fluid exits condenser 26 as an intermediate pressure liquid and is split, where part of the liquid passes through the bi-directional, variable area expansion valve 37, and the other part of the liquid passes through check valve 32. Upon exiting the expansion valve 37, the intermediate pressure liquid becomes a low pressure liquid. The low pressure liquid enters evaporator heat exchanger 43 to cool a space, such as a building. In an alternative embodiment, the evaporator may be used to cool another fluid, rather than directly cooling a building. The working fluid leaving evaporator 43 is a low pressure vapor and is passed through five-way reversing valve 23 from port 21 to port 22, where the working fluid returns to compressor 13. Port 19 is not used in the cooling mode. The remainder of the working fluid not passing through expansion valve 37 instead passes through check valve 32 and eventually returns to the liquid pump 47. Check valve 33 is checked closed.

In FIG. 2, the apparatus is configured for the heating mode. All functions of the system, unless noted below are the same as in FIG. 1. Differences from FIG. 1 include passing the combined flow from expander 9, after passing through recuperator 14, and the outlet flow from compressor 13 through port 19 of the five-way valve 23 to port 21. Recuperator 17 and port 18 are not used in the heating mode.

The intermediate pressure gas from five-way valve 23 leaves port 21 and passes through heat exchanger 43, which acts as a condenser.

The working fluid exits the condenser as an intermediate pressure liquid and is split where part of the liquid passes through the variable area, bi-directional expansion valve 37, and the other part of the liquid passes through check valve 33. The intermediate pressure liquid becomes a low pressure liquid, upon exiting expansion valve 37. The low pressure liquid enters heat exchanger 26, which is being used as an evaporator. The working fluid leaving the evaporator is a low pressure vapor and is passed into port 20 of five-way valve 23 and out of port 22, where the working fluid returns to compressor 13. The remainder of the working fluid not passing through expansion valve 37 instead passes through check valve 33 eventually returns to high pressure liquid pump 47. Check valve 32 is checked closed.

SUMMARY OF THE INVENTION

In one embodiment, the present invention is a heating, cooling, and power system comprising a prime mover including an exhaust and a heater thermally coupled to the exhaust of the prime mover. A shaft is coupled to the prime mover. An expander is coupled to the shaft. A first conduit is coupled between the heater and expander and configured for transporting a working fluid. A heat pump is coupled to the shaft. An electrical machine is coupled to the shaft and configured to produce electricity or produce mechanical shaft power.

In another embodiment, the present invention is a heating, cooling, and power system comprising a prime mover including an exhaust and a heater thermally coupled to the exhaust of the prime mover. A shaft is coupled to the prime mover. An expander is coupled to the shaft. A first conduit is coupled between the heater and expander and configured for transporting a working fluid. A heat pump is coupled to the shaft.

In another embodiment, the present invention is a heating, cooling, and power system comprising an expander and a shaft coupled to the expander. A heat pump is coupled to the shaft. An electrical machine is coupled to the shaft.

In another embodiment, the present invention is a method of making a heating, cooling, and power system comprising the steps of providing an expander for coupling to a shaft, providing an electrical machine for coupling to the shaft, and providing a heat pump configured for coupling through the shaft to the expander.

DETAILED DESCRIPTION OF THE DRAWINGS

Figure 1:
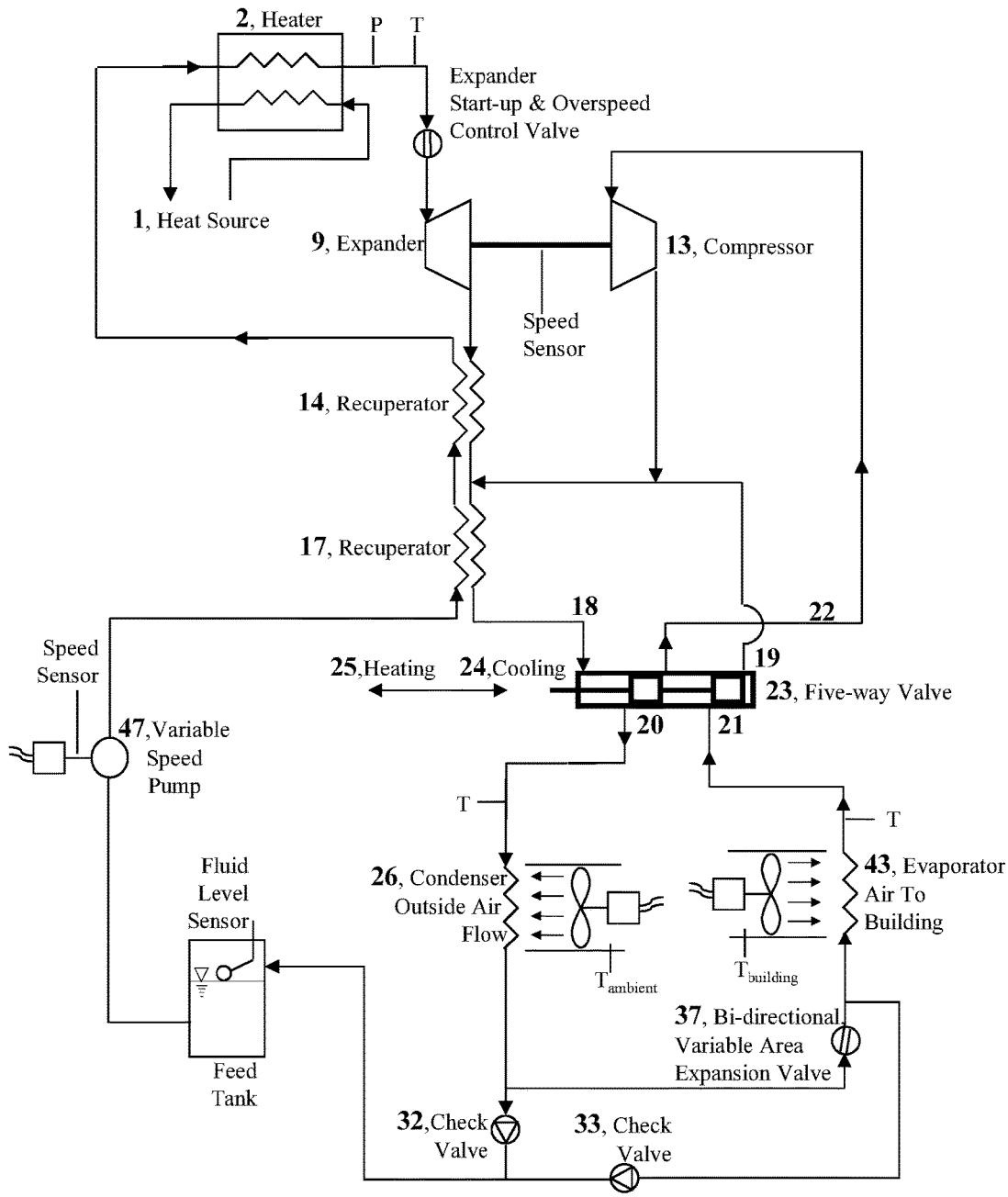
FIG. 1 is a diagrammatic view of the prior art apparatus as configured for cooling an environmentally controlled space.
Figure 2:
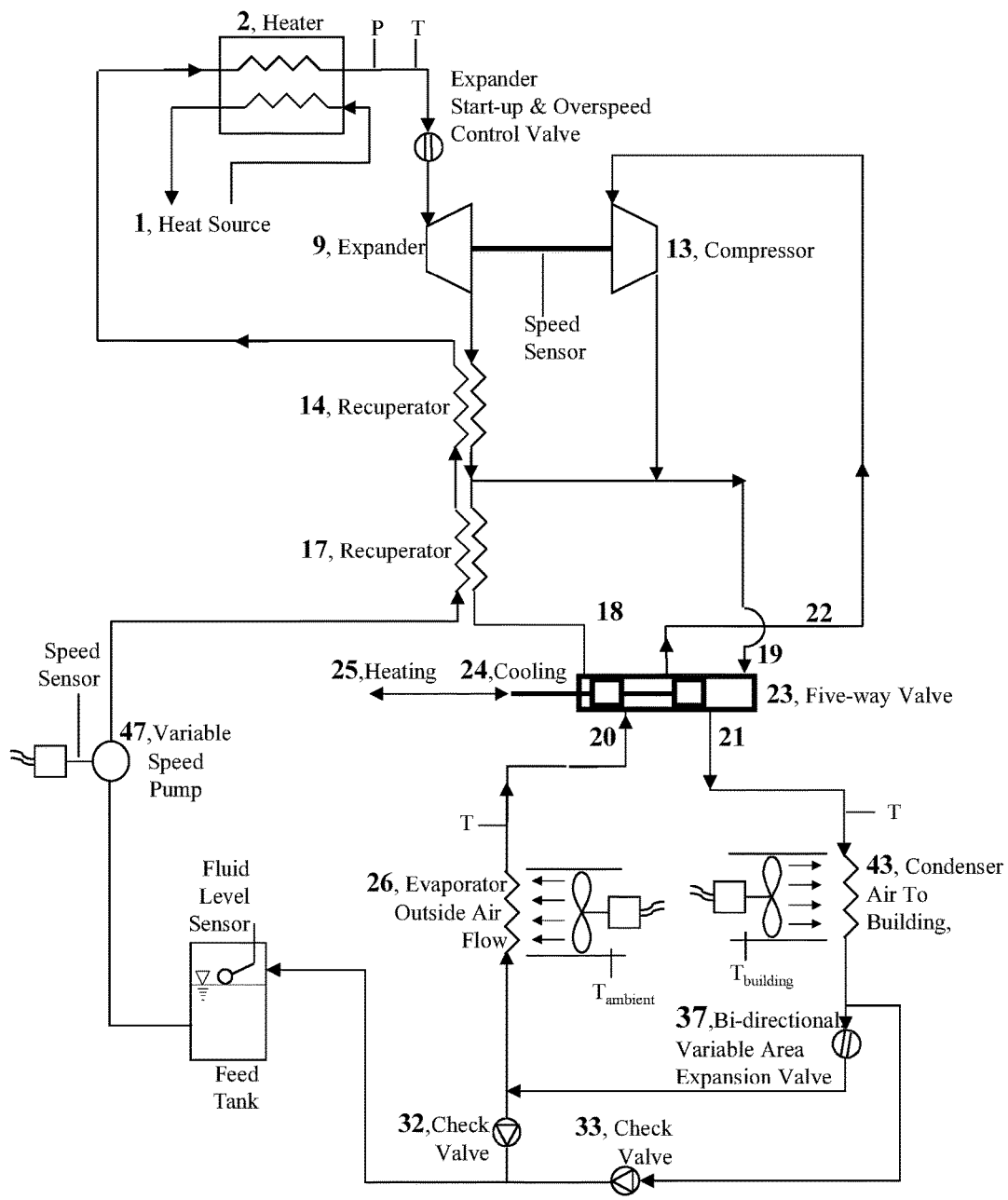
FIG. 2 is a diagrammatic view of the prior art apparatus as configured for heating an environmentally controlled space.

The present invention provides a process and apparatus for utilizing waste heat to power a reconfigurable thermodynamic cycle that can be used to selectively cool or heat an environmentally controlled space, such as a room or a building, plus generate electrical power. Alternative configurations will be presented that incorporate a motor/generator, such that the heat pump cycle can be supplemented with electrical power, during times when thermodynamic energy may not be sufficient. Another alternative configuration includes incorporation of a prime mover, such as an internal combustion engine, to mechanically drive the integrated power, cooling, and heating system. The heat generated by the prime mover is recovered to supply heat to help drive the heating and cooling cycle. The system provides a design which reasonably balances the need to maximize efficiency, while also keeping the design cost effective.

The thermodynamic cycle of this invention is a combination of a Rankine cycle to provide power and a refrigeration and heating cycle, commonly known as a heat pump. The system uses a single working fluid in both liquid and gaseous phases. The advantage of a single working fluid is that the system can tolerate some seal leakage between the expander and compressor and simplification of the overall system by reducing the total number of components required. The working fluid has desirable properties of low critical point pressure (less than 1000 psia) and temperature (less than 300° F.). Several common refrigerants are candidate working fluids.

Although, the combined Rankine and heat pump cycles are core to each integrated system, there are four typical configurations in which the thermodynamic core system is used. These are understood to be exemplary only and that other combinations can be obtained.

(a) Incorporate a generator into the system as a means to provide electrical energy when there is excess thermodynamic energy available that exceeds what is required for cooling or heating purposes.

(b) Incorporate an electric motor into the system as a means to supplement the heat pump cycle, when insufficient thermodynamic energy is available.

(c) Incorporate a motor and generator or a single machine that acts as a motor/generator. In addition to providing electrical power, when excess thermodynamic energy is available, the motor can be used to supplement the heat pump cycle, when insufficient thermodynamic energy is available.

(d) Incorporate a prime mover, such as an internal combustion engine, either alone, or in conjunction with a), b) or c) above. This configuration is preferable for portable, self-contained systems that provide combined electrical power, cooling and heating. The system could still be supplemented with external thermodynamic energy, in addition to the heat scavenged from the prime mover.

Accordingly, besides the objects and advantages of the cooling and heating apparatus described above, several objects and advantages of the present invention are:

(a) to provide cooling and heating and electrical power apparatus and process which is powered by heat energy from low temperature, waste heat sources, such as thermal solar, internal combustion engine exhaust, residual energy from steam generators, or any one of many other similar sources.

(b) to provide a cooling and heating system which can accommodate variable amounts of input energy with wide variations of temperature, and can be supplemented by an electric motor.

(c) to provide a self-contained system with a prime mover, which can provide direct shaft power that can easily be apportioned between providing heating or cooling and providing electrical power.

(d) to provide a means for supplementing the prime mover shaft power with shaft power from an expander, where the energy to drive the expander is scavenged from the prime mover and/or optionally supplemented by an external source.

(e) to provide a cooling, heating, and electrical power system which is simple in design and, therefore, is more cost effective to manufacture.

(f) to provide a system which is efficient, flexible in accommodating a variety of load conditions, and easy to control.

Figure 3:
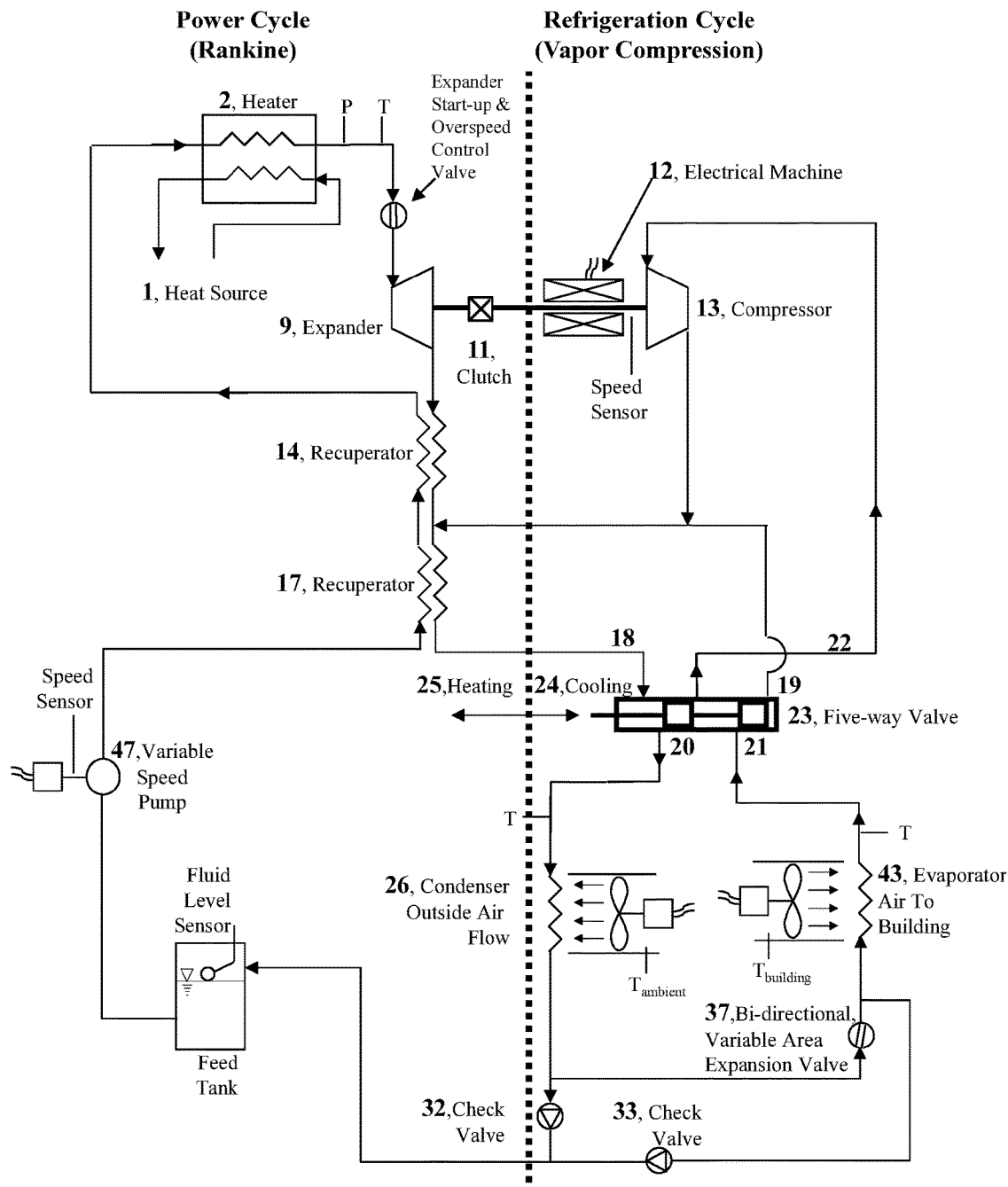
FIG. 3 is a diagrammatic view of the apparatus as configured for cooling with an integrated electrical machine, which could act as a generator only, a motor only, or as both a motor/generator.

The embodiments described herein are for the purposes of illustration only, and it is understood by those familiar in the art that numerous other embodiments are possible. In one embodiment of the invention, as illustrated in FIG. 3, the apparatus is configured in the preferred embodiment for the cooling mode, which works in a similar fashion as explained previously. An electric machine 12 and clutch 11 have been added. Clutch 11 becomes preferable when multiple modes of operation are desired. Clutch 11 could be externally actuated or a passive device, such as an overrunning clutch. Electric machine 12 could be a generator only, in which case clutch 11 is not necessary, as the generator could only operate when expander 9 is operable. Electric machine 12 could be a motor only, in which case clutch 11 could be a passive clutch of the overrunning type, which would allow the electric motor to drive vapor cycle compressor 13 independent of expander 9. Further, electric machine 12 could be a combination motor and generator, either independent devices or a single multi-function device. A single machine that can operate as either a motor or generator could be any of several devices well known to those experienced in the art. As in previous descriptions, the heat source for the expander could be any appropriate source or medium of heat of sufficient temperature and quantity to allow proper operation of the system.

Figure 4:
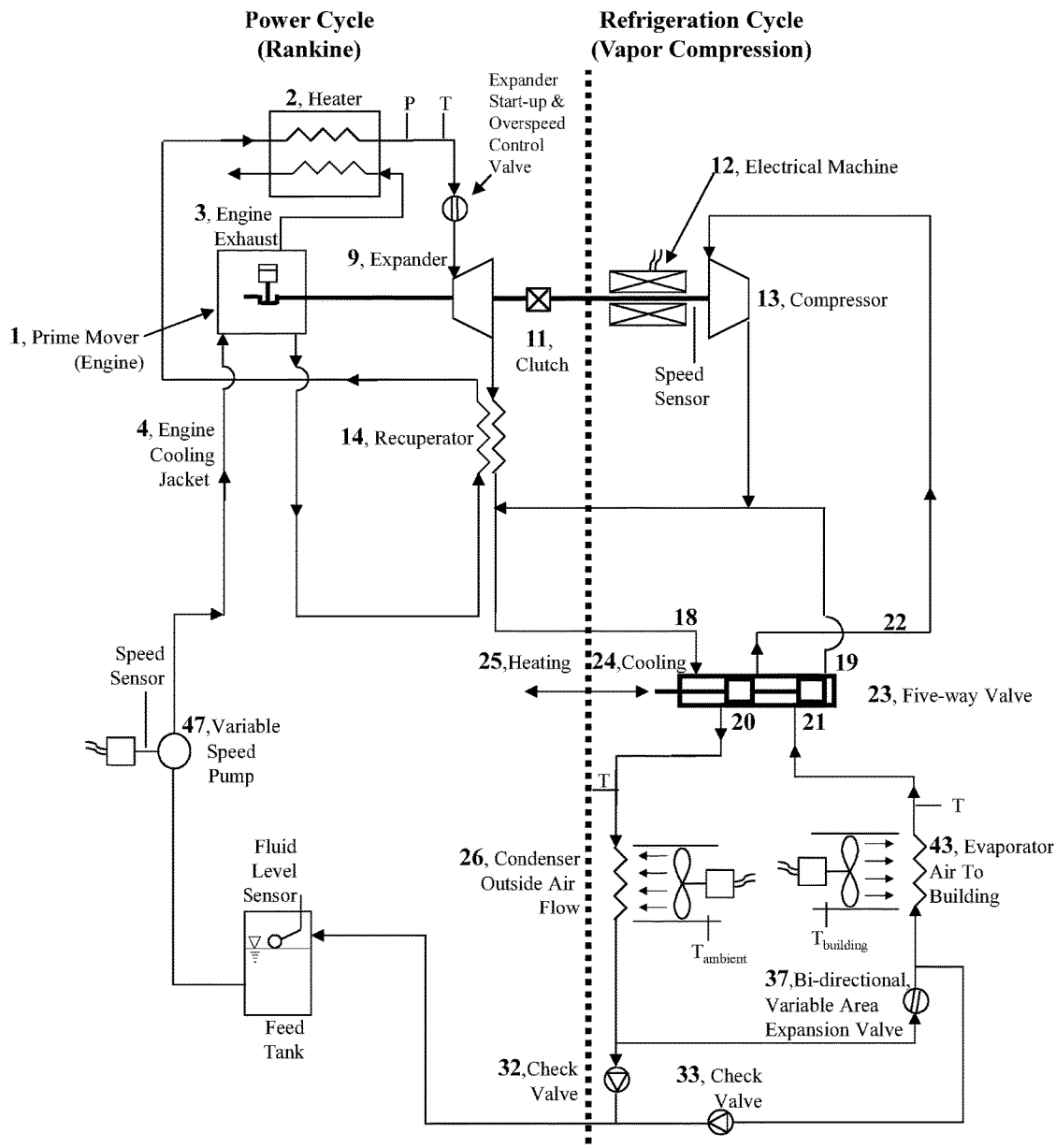
FIG. 4 is a diagrammatic view of the apparatus as configured for cooling an environmentally controlled space with an integrated prime mover, such as an internal combustion engine, from which waste heat is used to drive or assist in driving the cooling and heating cycle, plus an integrated electrical machine, which could act as a generator only, a motor only, or as both a motor/generator.

FIG. 4 illustrates the system of FIG. 3 with the addition of a prime mover. For the purposes of illustration only, prime mover 1 will be referred as an internal combustion engine or simply an engine 1. Engine 1 output shaft is directly coupled to expander 9, which is itself coupled to other major rotating components in the system. Since most engines reject the majority of heat produced from the fuel to the environment, in this invention, the normally rejected heat is captured and used to drive the expander. FIG. 4 illustrates how different grades of heat, or heat available at different temperatures from engine 1, may be captured and introduced to the Rankine cycle of the system. By example, the heat recovered by engine cooling jacket 4 is usually lower temperature, typically less than 150° C. In this case, no additional heat is attempted to be recovered from compressor 13 outlet flow. Recuperator 14 is still shown to recover usable heat remaining in expander 9 outlet flow. The optimum arrangement of recuperation and heating the working fluid will vary from application to application depending on the temperatures and amounts of heat available from various sources within engine 1, any other sources of available heat, and the importance of overall system efficiency versus cost for the additional system complexity.

Engine exhaust 3 can often exceed 500° C. and is shown in FIG. 4 to supply the heat input for the heater 2. The working fluid exits heater 2, having recovered a significant portion of the heat from engine exhaust 3, and produces additional shaft horsepower as it flows through expander 9 to supplement the shaft horsepower supplied by engine 1. In this respect, the Rankine cycle portion of the system acts as a bottoming cycle for engine 1.

One of the major benefits of this system arrangement of combined shaft power is that all the power from engine 1 and expander 9 can be applied as needed to any combination of air conditioning (or heating) load and electrical load demand, if the system includes an electrical machine 12 that can operate as a generator. For electrical power supplied by the system, engine 1 can be controlled to operate at a constant speed, and therefore supply the electrical power at a constant frequency. As either compressor 13 or generator 12 load increases, the fuel supply to engine 1 is increased to increase engine 1 output torque, but the speed can be maintained as constant to keep the electrical output frequency constant. An increase in the fuel flow to engine 1 will also increase the heat supplied to the heater 2, which increases the amount of supplemental shaft horsepower supplied to the system from expander 9.

Although the figures depict the rotating components on a common shaft, in some applications it may be beneficial to have one or more of the components rotating at different speeds through use of a gearbox or other speed reducing or speed increasing device.

The present invention provides an apparatus for utilizing waste heat to drive a reconfigurable thermodynamic cycle that can be used to selectively cool or heat an environmentally controlled space, such as a room, building, or vehicle, can provide electrical power, and optionally can be coupled to a prime mover. The system provides a design which reasonably balances the need to maximize efficiency, while also keeping the design cost effective.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A heating, cooling, and power system, comprising:
a piston engine including an exhaust and a cooling jacket;
a heater thermally coupled to the exhaust of the piston engine, wherein the piston engine exhaust provides heat input to the heater;
a shaft mechanically coupled to the piston engine, wherein the piston engine provides a first power output to rotate the shaft;
an expander mechanically coupled to the shaft to provide a second power output in addition to the first power output of the piston engine rotating the shaft, wherein the first power output of the piston engine and the second power output of the expander are applied to the shaft simultaneously;
a first conduit coupled between the cooling jacket of the piston engine and the heater to transport a working fluid from the cooling jacket of the piston engine to the heater, wherein the heater transfers heat from the piston engine exhaust to the working fluid;
a second conduit coupled between the heater and the expander to transport the working fluid from the heater to the expander;
a heat pump including,
  a compressor mechanically coupled to the shaft, wherein the first power from the piston engine powers the compressor in combination with the second power from the expander,
  a condenser including a third conduit coupled between the expander and the condenser to transfer the working fluid from the expander to the condenser,
  an expansion valve including a fourth conduit coupled between the condenser and the expansion valve to transfer the working fluid from the condenser to the expansion valve,
  an evaporator including a fifth conduit coupled between the expansion valve and the evaporator to transfer the working fluid from the expansion valve to the evaporator, and
  a sixth conduit coupled between the evaporator and the compressor to transfer the working fluid from the evaporator to the compressor;
a pump;
a seventh conduit coupled between the heat pump and the pump to transport the working fluid from the heat pump to the pump;
an eighth conduit coupled between the pump and the cooling jacket of the piston engine to transfer the working fluid from the pump to the cooling jacket;
an electrical machine mechanically coupled to the shaft, wherein the electrical machine produces electrical current from rotation of the shaft provided by the first power output of the piston engine in combination with the second power output of the expander; and
a clutch mechanically coupled to the shaft between the compressor and the expander to disconnect the compressor from the expander and allow the compressor to be driven by the electrical machine.

2. The heating, cooling, and power system of claim 1, further including a recuperator coupled between the expander and the recuperator to recover heat from the working fluid exiting the expander.

3. The heating, cooling, and power system of claim 1, wherein the heat pump includes a valve connected to the third conduit to switch the heat pump between a heating mode and a cooling mode.

4. The heating, cooling, and power system of claim 1, wherein the clutch is mechanically coupled to the shaft between the electrical machine and the piston engine.

5. A heating, cooling, and power system, comprising:
a piston engine including an exhaust;
a heater thermally coupled to the exhaust of the piston engine and configured to transfer heat from the exhaust of the piston engine to a thermal energy in a working fluid flowing through the heater;
a shaft coupled to the piston engine, wherein a kinetic energy of the shaft is increased by power from the piston engine;
an expander coupled to the shaft to supplement the rotational power of the piston engine by transferring the thermal energy of the working fluid to the kinetic energy of the shaft, wherein the piston engine and the expander add to the kinetic energy of the shaft simultaneously;
a first conduit coupled between the heater and the expander;
a heat pump powered by the kinetic energy of the shaft, wherein the working fluid operates as a refrigerant of the heat pump, and wherein the heat pump includes,
  a first heat exchanger,
  a second conduit coupled between the expander and the first heat exchanger to transport the working fluid from the expander to the first heat exchanger,
  an expansion device,
  a third conduit coupled between the first heat exchanger and the expansion device to transport the working fluid from the first heat exchanger to the expansion device,
  a second heat exchanger; and
  a fourth conduit coupled between the expansion device and the second heat exchanger to transport the working fluid from the expansion device to the second heat exchanger; and
a clutch coupled to the shaft and configured to disconnect the heat pump from the piston engine and the expander.

6. The heating, cooling, and power system of claim 5, further including a recuperator comprising a second conduit to transport the working fluid from the expander to the recuperator.

7. The heating, cooling, and power system of claim 5, wherein the heat pump includes a valve coupled to the second conduit to switch the heat pump between a heating mode and a cooling mode.

8. The heating, cooling, and power system of claim 5, wherein the heat pump includes a compressor coupled to the shaft.

9. The heating, cooling, and power system of claim 8, further including an electrical machine coupled to the shaft.

10. The heating, cooling, and power system of claim 9, wherein the electrical machine is capable of producing electrical current from the kinetic energy of the shaft, and wherein the electrical machine is capable of transferring an electrical power to the kinetic energy of the shaft.

11. The heating, cooling, and power system of claim 5, further including a pump coupled between the heat pump and the heater to pressurize the working fluid and transport the working fluid from the heat pump to the heater.

12. A heating, cooling, and power system, comprising:
a prime mover;
a shaft coupled to the prime mover, wherein a power output of the prime mover is applied as a kinetic energy of the shaft;
an expander mechanically coupled to the shaft and thermally coupled to the prime mover to convert a thermal energy from the prime mover to an increase in the kinetic energy of the shaft;
a heat pump coupled to the shaft, wherein the heat pump includes,
  a compressor powered by the kinetic energy of the shaft;
  a first heat exchanger comprising a first conduit coupled between the expander and the first heat exchanger, the first conduit configured for transporting a working fluid from the expander to the first heat exchanger;
  an expansion device comprising a second conduit coupled between the first heat exchanger and the expansion device, the second conduit configured for transporting the working fluid;
  a second heat exchanger comprising a third conduit coupled between the expansion device and the second heat exchanger, the third conduit configured for transporting the working fluid, and a fourth conduit coupled between the second heat exchanger and the compressor; and an electrical machine coupled to the shaft.

13. The heating, cooling, and power system of claim 12, wherein the heat pump includes a valve connected to the second conduit to switch the heat pump between a heating mode and a cooling mode.

14. The heating, cooling, and power system of claim 12, further including a clutch coupled to the shaft to disengage the expander from the heat pump and the electrical machine.

15. The heating, cooling, and power system of claim 12, wherein the electrical machine generates electricity.

16. A method of making a heating, cooling, and power system, comprising:

providing a prime mover including an exhaust output and a cooling jacket;

providing a heater;

coupling a first input of the heater to the exhaust output of the prime mover, wherein an exhaust from the prime mover flows from the exhaust output of the prime mover to the first input of the heater;

coupling a second input of the heater to the cooling jacket of the prime mover, wherein a working fluid flows from the cooling jacket of the prime mover to the second input of the heater and the heater transfers thermal energy from the exhaust to the working fluid;

coupling a shaft to the prime mover, wherein the prime mover provides a first power output to rotate the shaft;

providing an expander including a first input coupled to receive the working fluid from the heater and provide a second power output to rotate the shaft, wherein the second power output of the expander and the first power output of the prime mover contribute to a kinetic energy of the shaft simultaneously;

coupling an electrical machine to the shaft;

using the electrical machine to convert the kinetic energy of the shaft to electrical current while the first power output and the second power output are each contributing to the kinetic energy of the shaft; and providing a heat pump including a compressor coupled through the shaft to the expander, wherein the kinetic energy of the shaft turns the compressor and the working fluid operates as a refrigerant of the heat pump.

17. The method of claim 16, further including coupling a clutch to the shaft to disengage the compressor or expander.

18. The method of claim 16, wherein providing the heat pump further includes:

providing a first heat exchanger comprising a first conduit coupled between the expander and the first heat exchanger, the first conduit configured for transporting a working fluid;

providing an expansion device comprising a second conduit coupled between the first heat exchanger and the expansion device, the second conduit configured for transporting the working fluid; and providing a second heat exchanger comprising a third conduit coupled between the expansion device and the second heat exchanger, the third conduit configured for transporting the working fluid.

19. The method of claim 18, further including providing a valve to switch the heat pump between a heating mode and a cooling mode.

20. The method of claim 16, further including using the heat pump to selectively cool or heat a room.

* * * * *